United States Patent Office 3,404,951
Patented Oct. 8, 1968

3,404,951
BASIC COPPER SULFATE
Hideo Tanabe, Nishinomiya, and Yasuo Sano, Kawanishi, Japan, assignors to Takeda Chemical Industries, Ltd., Osaka, Japan
Continuation-in-part of application Ser. No. 390,786, Aug. 18, 1964. This application Sept. 9, 1966, Ser. No. 578,192
6 Claims. (Cl. 23—125)

ABSTRACT OF THE DISCLOSURE

A novel basic sulfate is prepared by addition of copper sulfate and alkali solutions to a phosphate solution in definite proportions.

---

Figure 1:
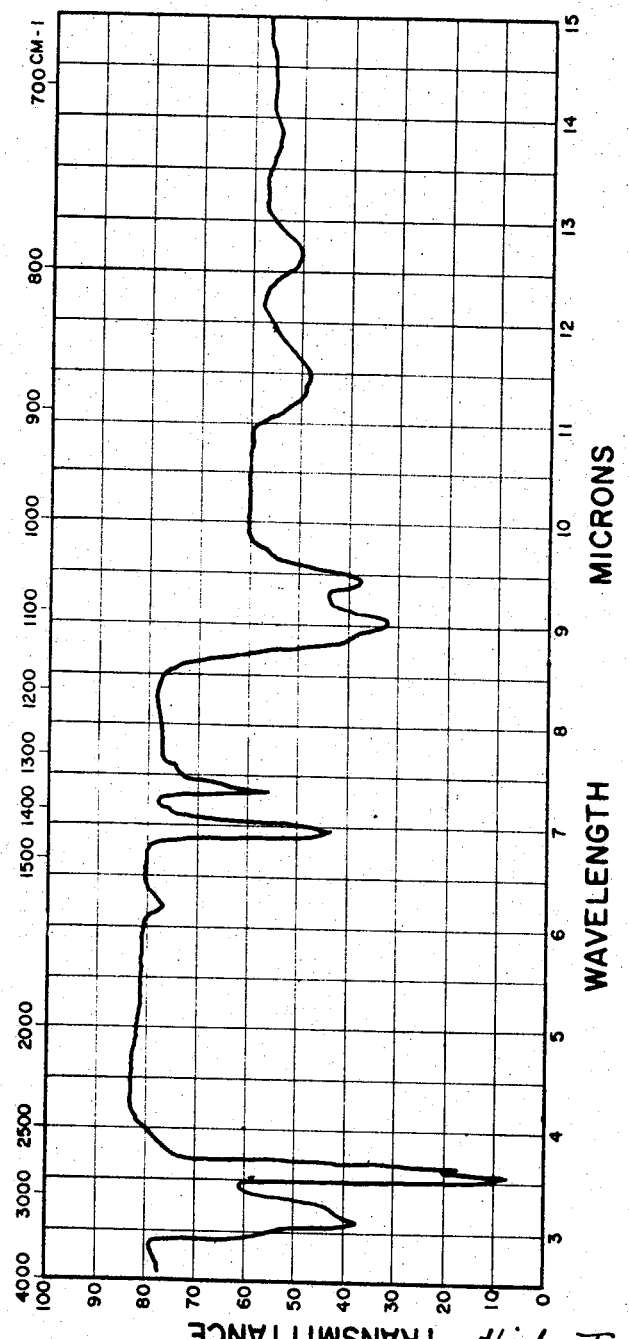

The present application is a continuation-in-part of copending application, Ser. No. 390,786, now abandoned, filed Aug. 18, 1964.

This invention relates to novel basic copper sulfate represented by the formula, $Cu_4(OH)_6SO_4 \cdot H_2O$, and to a method for preparing the same, which comprises reacting copper sulfate with an alkali hydroxide in the presence of phosphoric anion donor, with production of a novel composition containing the basic copper sulfate and basic copper phosphate.

According to the present invention, a novel basic copper sulfate is prepared, which shows stronger fungicidal action than hitherto known basic copper sulfates against various kinds of micro-organisms causing plant diseases. Moreover, it has been clarified that the said novel basic copper sulfate is represented by the formula $$Cu_4(OH)_6SO_4 \cdot H_2O$$

The first object of this invention is to provide a novel basic copper sulfate which is represented by the formula $Cu_4(OH)_6SO_4 \cdot H_2O$ and which has distinct characteristics differentiating it from hitherto-known basic copper sulfate. Another object is to provide a method for preparing the novel basic copper sulfate. Hereinafter, the basic copper sulfate represented by the formula $$Cu_4(OH)_6SO_4 \cdot H_2O$$

is referred to as "basic copper sulfate of this invention."

The new type of basic copper sulfate which has been produced in various ways. Addition of an alkali solution to a copper sulphate solution usually forms brochantite only.

In the course of searching for new fungicidal chemicals that can be used in place of Bordeaux mixture, the new type of basic copper sulphate of this invention, which has proved to have excellent fungicidal effects, was prepared.

The basic procedure of preparing the new basic copper sulfate consists in simultaneous addition of a copper sulphate solution and an alkali solution to a phosphate solution. As phosphate for the solution trisodium orthophosphate is most convenient. The product is a crystalline fine powder. The optimum condition for the preparation of this product is conferred by the X-ray diffraction patterns of the product.

Table I shows the degree of crystallinity of the products prepared in various ratios of the reagents.

TABLE I

| $Na_3PO_4$ | NaOH | | | | | |
|---|---|---|---|---|---|---|
| | 1.20 | 1.30 | 1.40 | 1.50 | 1.55 | 1.60 |
| 0 | | | | | | |
| 0.003 | | | | ±±±+ | | |
| 0.005 | | | | ±±±+ | | |
| 0.010 | | | | ++++ | +++ | |
| 0.020 | | | | +++++ | | ++ |
| 0.030 | | | ++++− | ++++ | | |
| 0.050 | | | ++++ | ++++ | | |
| 0.070 | | ++− | ++++ | +++ | | |
| 0.100 | | ++ | ++++ | ++ | | ++ |
| 0.155 | | | X | | | |

+=New Crystal. −=Brochantite type. X=Amorphous.

The optimum molar ratio of the reagents $CuSO_4$, NaOH, and $Na_3PO_4$ is 1:1.5:0.01–0.05. If the molar ratio of $Na_3PO_4$ is smaller than 0.01, the products do not always result in the new type but are in some cases entirely of the brochantite type. If the ratio of $Na_3PO_4$ is larger than 0.05, the X-ray diffraction lines become dull. When the ratio of NaOH is smaller than 1.50, the products tend to contain the brochantite type of basic copper sulphate, and when larger than 1.50, the products are contaminated with copper hydroxide or oxide. In some cases where the ratio of $Na_3PO_4$ is very small, the crystals of the new basic copper sulphate, just after filtration, are found to turn into brochantite type while drying.

The analysis data of the new crystals are shown in Table II:

TABLE II

| | 0.03 | | 0.005 | | 0.003 | | 0.002 | |
|---|---|---|---|---|---|---|---|---|
| | Percent | Molar ratio | Percent | Molar ratio | Percent | Molar ratio | Percent | Molar ratio |
| Molar ratio of $Na_3PO_4$(x): | | | | | | | | |
| Cu | 54.93 | 1.0 | 54.96 | 1.0 | 51.16 | 1.0 | 53.96 | 1.0 |
| $SO_4$ | 16.15 | 0.194 | 19.51 | 0.235 | 18.49 | 0.239 | 19.73 | 0.242 |
| $PO_4$ | 2.67 | 0.033 | 0.43 | 0.005 | 0.23 | 0.003 | 0.15 | 0.002 |
| OH | 23.2 | 1.58 | | | | | 22.3 | 1.54 |
| $H_2O$ | 3.10 | 0.20 | | | | | 3.90 | 0.25 |

Molar ratio is $CuSO_4$: $NaOH$:$Na_3PO_4$=1:1.5:x.

prepared by the present invention is a pale blue crystalline fine powder with the aforesaid composition formula of $Cu_4(OH)_6SO_4 \cdot H_2O$ and with fungicidal activity. For the formation of this compound phosphoric ion (or boric ion, or arsenic ion) is indispensable. It is different in structure from the natural basic copper sulfate of the same composition, langite.

There are four types of basic copper sulphate in nature, i.e., langite, $Cu_4(OH)_6SO_4 \cdot H_2O$; brochantite, $$Cu_4(OH)_6SO_4$$

antlerite, $Cu_3(OH)_4SO_4$; and dolerophanite, $Cu_2O(SO_4)$. The latter three compounds have been synthetically produced, but not yet langite. Several other types of basic copper sulphate have been reported as being synthetically It is thus established that phosphoric ion is not a constituent of the crystal, although it is necessary for the crystallization of the new basic copper sulphate. The molecular formula of the crystal is $Cu_4(OH)_6SO_4 \cdot H_2O$.

Instead of phosphate sodium arsenate and sodium borate can also be used for the preparation of the new basic copper sulphate but optimal results are achieved with the phosphate.

It is significant to compare the new basic copper sulphate with brochantite and langite, because without phosphoric ion, brochantite is produced under the same condition as used for the preparation of the new crystals and the composition formula of langite is the same as that of the new crystal.

In appearance the new crystal is pale blue, while brochantite is blue. Insolubility is common to these two basic copper sulfates.

X-ray diffraction patterns are as follows:

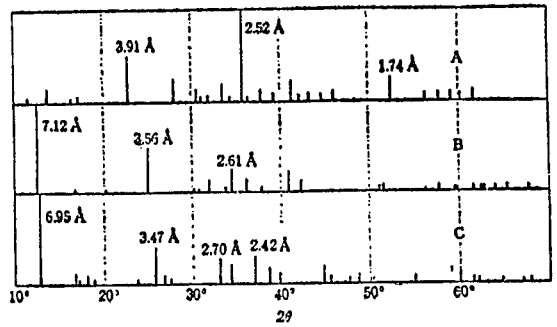

A=Brochantite.    B=Langite.    C=New Crystal.

The lattice constants of brochantite and langite, and the crystal structure of the former have been determined. The lattice constants of the new crystal are shown in Table III:

TABLE III.—DATA ON THE CRYSTALS

|  | Brochantite | Langite | New crystal |
| --- | --- | --- | --- |
| Crystal system | Monoclinic | Orthorhombic | Orthorhombic. |
| Lattice constant | a=6.02 | a=6.02 | a=6.03. |
|  | b=9.85 | b=11.22 | b=10.80. |
|  | c=13.08 | c=7.12 | c=13.90. |
|  | β=103°22′ |  |  |
| Space group | P2₁/C | Pba2 | ?. |
| Formula (Lattice unit) | (¹) | (²) | (³) |
| Sp. gr.: |  |  |  |
| Calcd | 3.97 | 3.26 | 3.45. |
| Found | 3.98 | 3.31 | 3.42. |

¹ $Cu_{16}(OH)_{24}(SO_4)_4$    ² $Cu_8(OH)_{12}(SO_4)_2(H_2O)_2$    ³ $Cu_{16}(OH)_{24}(SO_4)_4(H_2O)_4$

The lattice constants were estimated from the data of the X-ray diffraction pattern and by comparison with those of brochantite and langite. According to these the indices may be assigned as shown in Table IVa.

TABLE IVa.—DATA OF X-RAY DIFFRACTION PATTERN FOR THE NEW CRYSTAL
[CuKα; Ni filter]

| d (A.) | Intensity | Calcd. d (A.) | Plane |
| --- | --- | --- | --- |
| 6.95 | 100 | 6.95 | (002) |
| 3.47 | 38 | 3.47 | (004) |
| 2.70 | 26 | 2.70 | (040) |
| 2.61 | 18 | 2.63 | (220) |
| 2.42 | 30 | 2.42 | (141) |
| 2.32 | 16 | 2.33 | (043) |
| 2.26 | 10 | 2.26 | (016) |
| 2.02 | 15 | 2.01(?) | (151) |
|  |  | 2.03(?) | (150) |
| 1.99 | 7 | 1.99 | (241) |
|  |  | 1.98 | (301) |

The following Table IVb shows the result of the respective X-ray diffractions of the basic copper sulfate of this invention, and of langite and brochantite-type basic copper sulfate:

TABLE IVb

| Basic copper sulfate of this invention, lattice spacings (angstrom) | Brochantite-type basic copper sulfate, lattice spacings (angstrom) | Langite, lattice spacings ¹ (angstrom) |
| --- | --- | --- |
| 6.95 (very strong) | 6.51 (middle) | 7.21 (very strong). |
| 3.47 (middle) | 5.44 (middle) | 3.56 (strong). |
| 2.70 (middle) | 3.92 (strong) | 2.80 (weak). |
| 2.62 (middle) | 3.21 (middle) | 2.60 (middle). |
| 2.42 (middle) | 2.93 (weak) | 2.49 (strong). |
| 2.33 (middle) | 2.70 (strong) | 2.20 (middle). |
| 2.26 (middle) | 2.52 (very strong) | 2.13 (middle). |
| 2.02 (middle) | 2.47 (weak) | 1.81 (weak). |
| 1.99 (middle) | 2.19 (weak) | 1.77 (middle). |
| 1.54 (weak) | 1.75 (middle) | 1.59 (weak). |

¹ Bull. Soc. Franc. Miner. Crist. 81 257(1958).

As is shown in Table IVb, it is clear that the basic copper sulfate of this invention has different crystalline structure from the known langite or brochantite (brochantite-type basic copper sulfate).

The reaction according to this invention is optimally carried out at a temperature around room temperature (about 15° to about 30° C.) with or without stirring. Generally, the use of suitable solvent, e.g., water, has a desirable effect on the reaction. In general, as indicated the reaction is best carried out by adding alkali hydroxide and copper sulfate simultaneously to the phosphoric acid or its salt. More specifically, the reaction is best carried out by adding a solution of copper sulfate and a solution of alkali hydroxide simultaneously to a solution of phosphoric acid or its salt at the same rate at a temperature around room temperature. By the expression "at the same rate," it is intended to indicate such rate that when any fractional quantity of the one solution has been added, the same fractional quantity of the other solution will have been added; complete addition of the two solutions will be achieved simultaneously. As the objective basic copper sulfate of this invention is insoluble in water, the employment of water as a solvent is especially desirable in view of the procedure for the recovery of the basic copper sulfate of this invention, etc.

It is concluded that, in the above-mentioned reaction basic copper phosphate is first formed, and thus formed basic copper phosphate stimulates the crystallization of the basic copper sulfate represented by the formula $Cu_4(OH)_6SO_4 \cdot H_2O$ and the crystallization of the basic copper sulfate then continues irrespective of the presence of the basic copper phosphate. In other words, the crystallization of the basic copper sulfate represented by the formula $Cu_4(OH)_6SO_4 \cdot H_2O$ is not started without the presence of basic copper phosphate, though the presence of basic copper phosphate is not necessarily required after the crystallization of the basic copper sulfate begins.

It is not essential, from the standpoint of practical use, to separate the basic copper sulfate represented by the formula $Cu_4(OH)_6SO_4 \cdot H_2O$ from basic copper phosphate. A composition consisting of the basic copper sulfate and basic copper phosphate is utilizable as a fungicide. Ratios of the components may vary with the ratio of the starting materials employed. However, in general, the composition comprises the following ratios:

| | Weight percent |
| --- | --- |
| Cu | 51–57 |
| $SO_4$ | 7–21 |
| $PO_4$ | 0.15–9 |
| OH | 22–26 |
| $H_2O$ | 2–4 |

Brochantite-type basic copper sulfate has been known to have a germicidal effect. However, the germicidal effect is rather weak. Further, brochantite-type basic copper sulfate shows its germicidal effect against only a limited number of microorganisms causing plant diseases. For example, brochantite type basic copper sulfate has no effect on powdery mildew of cucumber, or other vegetables; while the basic copper sulfate of this invention shows its excellent fungicidal effect in wider scope, i.e., against, e.g., late blight of cucumber, downy mildew of cucumber, anthracnose of cucumber, powdery mildew of cercospora, leaf spot of sugar beet, leaf mold of tomato, black spot of rose, stem end rot, scab, etc., with little phytotoxicity.

Bordeaux index of the basic copper sulfate of this invention is about 0.622, while that of brochantite-type basic copper sulfate is about 0.272.

The following tests show the fungicidal effect of the basic copper sulfate of this invention. In these tests, (A) and (B) are compositions consisting of (1) the basic copper sulfate represented by the formula $$Cu_4(OH)_6SO_4 \cdot H_2O$$

as the active ingredient and (2) basic copper phosphate. Ratios of the components of (A) and (B) are as follows:

(A) Cu:OH:SO$_4$:PO$_4$=4:6:0.82:0.12 (molar ratio)
(B) Cu:OH:SO$_4$:PO$_4$=4:6:0.91:0.06 (molar ratio)

In the tests, (A) and (B) are applied to plants in a form of suspension having a concentration of 575 μg./ml., 383 μg./ml. and 288 μg./ml., calculated as copper, respectively.

Test 1.—Effect on anthracnose of cucumber

*Method of test.*—*Colletotrichum lagenarium* Ellis et Halsted is incubated on a potato-agar medium at 25° C. for 3 days. Then, conidia are suspended in water at a rate of 8–10×10$^5$/ml.

Cucumber variety Su-yo reared in a pot of 9 cm. diameter is employed. The test is repeated 2 times, employing 5 pots per one plot.

10 ml./pot of the suspension of (A) or (B) is sprayed onto the cucumber. Then, 3 ml./pot of the suspension of conidia prepared above is inoculated on the cucumber treated with the suspension of (A) or (B), after the cucumber has dried. 7 days later, the number of lesions in the leaves is noted.

As the control, cucumber which is treated in the same way as mentioned above, except that there is no treatment with the suspension of (A) or (B), is observed.

Result:

| | Concentration of the suspension of (A) or (B) (calculated as Cu), μg./ml. | Number of leaves tested | Total number of lesions in the leaves | Morbidity rate,[1] percent |
|---|---|---|---|---|
| Treated plot: | | | | |
| (A) | 575 | 10 | 285 | 29 |
| | 383 | 10 | 374 | 38 |
| | 288 | 10 | 423 | 43 |
| (B) | 575 | 10 | 305 | 31 |
| | 383 | 10 | 482 | 49 |
| | 288 | 10 | 482 | 49 |
| Non-treated plot: | | 10 | 984 | 100 |

[1] Morbidity rate = $\frac{\text{Number of lesions in the treated plot}}{\text{Number of lesions in the non-treated plot}} \times 100$.

Test 2.—Effect on downy mildew of cucumber

*Method for test.*—*Pseudoperonospora cubensis* (Berkeley et Curts) Rostow are collected from lesions occurred in leaves of cucumber spontaneously. Then, the suspension of conidia (8–10×10$^5$/ml.) is prepared.

Cucumber variety Su-yo reared in a pot of 9 cm. diameter is employed for the test. The test is repeated 2 times by employing 5 pots per one plot.

The suspension of (A) or (B) is sprayed to the cucumber in a rate of 10 ml./pot. Then, 2–3 ml. of the suspension of conidia prepared above is inoculated on thus treated cucumber, after the cucumber is dried. 7 days after the inoculation, the number of all lesions occurred in the leaves are measured.

As the control, cucumber which is treated in the same way as mentioned above but not treated with the suspension of (A) or (B), is employed.

Result:

| | Concentration of the suspension of (A) or (B) (calculated as Cu), μg./ml. | Number of leaves tested | Total number of lesions in the leaves | Morbidity rate,[1] percent |
|---|---|---|---|---|
| Treated plot: | | | | |
| (A) | 575 | 10 | 229 | 40 |
| | 383 | 10 | 257 | 45 |
| | 288 | 10 | 257 | 45 |
| (B) | 575 | 10 | 229 | 40 |
| | 383 | 10 | 292 | 51 |
| | 288 | 10 | 292 | 51 |
| Non-treated plot | | 10 | 572 | 100 |

[1] Morbidity rate = $\frac{\text{Number of lesions in the treated plot}}{\text{Number of lesions in the non-treated plot}} \times 100$.

In practice, the basic copper sulfate of this invention may be applied to plants as it is or in a form of compositions such as dust, emulsion, suspension or solution.

The compositions may be readily prepared ab initio or may, e.g., be in the form of concentrates comprising the basic copper sulfate of this invention with only a minor amount of an adjuvant, e.g., a surface active agent, extender, etc. Such a concentrate is economical as regards transportation, storage and the like, and may easily be mixed prior to use with additional adjuvant to give the desired concentration of the basic copper sulfate of this invention when it is applied. The adjuvant may be selected depending on plants to be treated, other adjuvant to be used, and conditions of use, etc.

When the compositions are used in dust form, the adjuvant (or diluent) may be, e.g., talc, clay, diatomaceous earth, lime, calcium sulfate, kaolin, soybean powder, alumina, active charcoal and the like.

When the compositions are used in the form of liquid, the adjuvant (diluent) is, e.g., water.

The compositions may further contain wetting agents, dispersing agents and emulsifiers such as suitable surface active agents, e.g., polyoxyethylene-glycolethers, polyoxyethyleneglycolesters, polyoxyethylene derivatives of sorbitan monolaurate (monostearate), polyoxyethylene-alkylarylether, alkyl sulfonate, alkylarylsulfonate, alkyl sulfosuccinate, etc. If necessary, casein, gelatin, starch, alginic acid, agar, carboxymethylcellulose, polyvinyl alcohol, rice bran oil, bentonite, etc. may be employed. They may also contain adherent or sticking agents, and also other agricultural chemicals, e.g., pesticides, fungicides, manure or fertilizer, growth controlling agents, plant hormones, etc., all these materials being considered "adjuvants."

The effective amount of the basic copper sulfate of this invention may vary with the kind, stage or condition of plants, kind of plant diseases, time at which the basic copper sulfate of this invention is applied, etc. However, in general it is sufficient to employ 10–500 grams, calculated as copper, per 10 acres.

Presently-preferred exemplary embodiments follow.

Throughout this specification, the abbreviations "mm.," "ml.," "cm.," "μg.," "g.," "kg.," and "l." represent, respectively, "millimeter(s)," "milliliters(s)," "centimeter(s)," "microgram(s)," "gram(s)," "kilogram(s)," and "liters."

EXAMPLE 1

To an aqueous solution of 50 g. of trisodium phosphate (Na$_3$PO$_4 \cdot$12H$_2$O) in 880 ml. of water are added simultaneously an aqueous solution of 1.1 kg. of copper sulfate (CuSO$_4 \cdot$5H$_2$O) in 4.95 l. of water, and 4.95 l. of 1.5 N-sodium hydroxide with stirring for 25 minutes. Then, the resultant mixture is stirred for 30 minutes. Precipitates thus formed are collected by filtration, washed with water and then dried at 100° C. to yield 508 g. of pale fine powder.

*Analysis.*—Cu, 54.93%; SO$_4$, 16.15%; PO$_4$, 2.61%; H$_2$O, 3.10%.

EXAMPLE 2

A fungicidal powder comprises 0.3% of aluminum stearate, 88.7 parts of talc and 11% (corresponding to 6% calculated as copper) of fine pale powder product prepared in Example 1.

EXAMPLE 3

A wetting powder comprises 4% of sodium dimethyl, 11% of clay, and 85% (corresponding to 44% calculated as copper) of fine pale powder prepared in Example 1.

Figure 2:
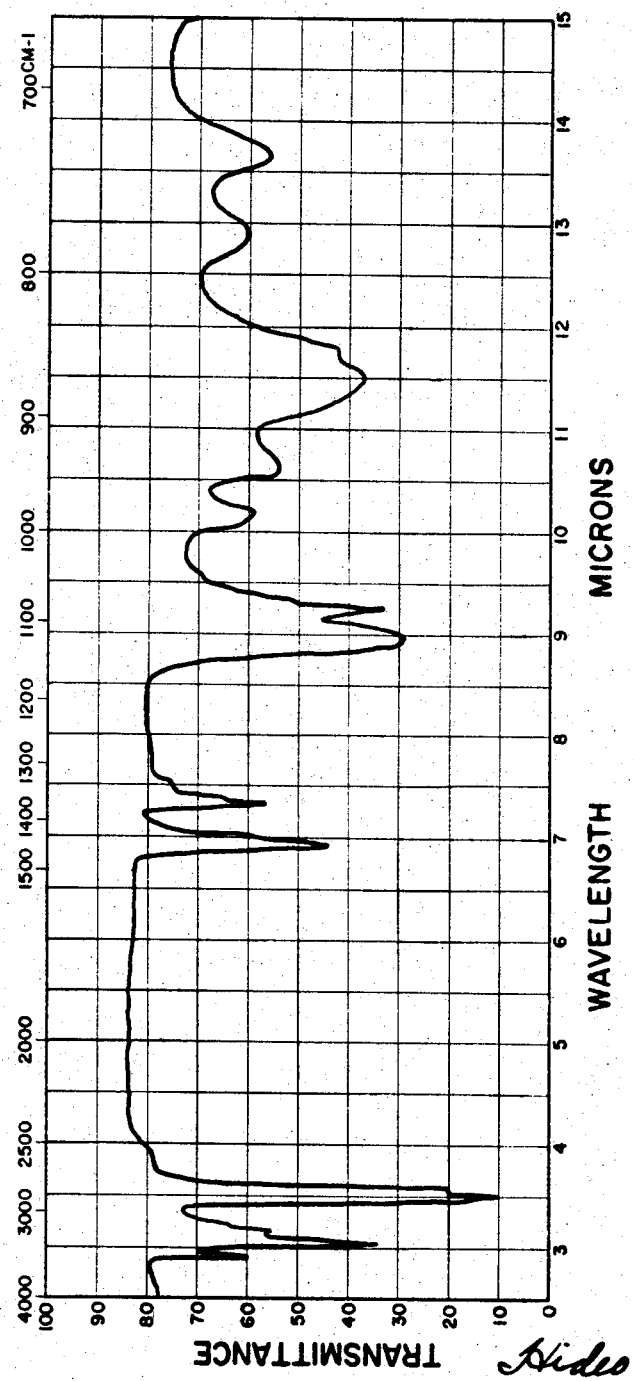
Figure 3:
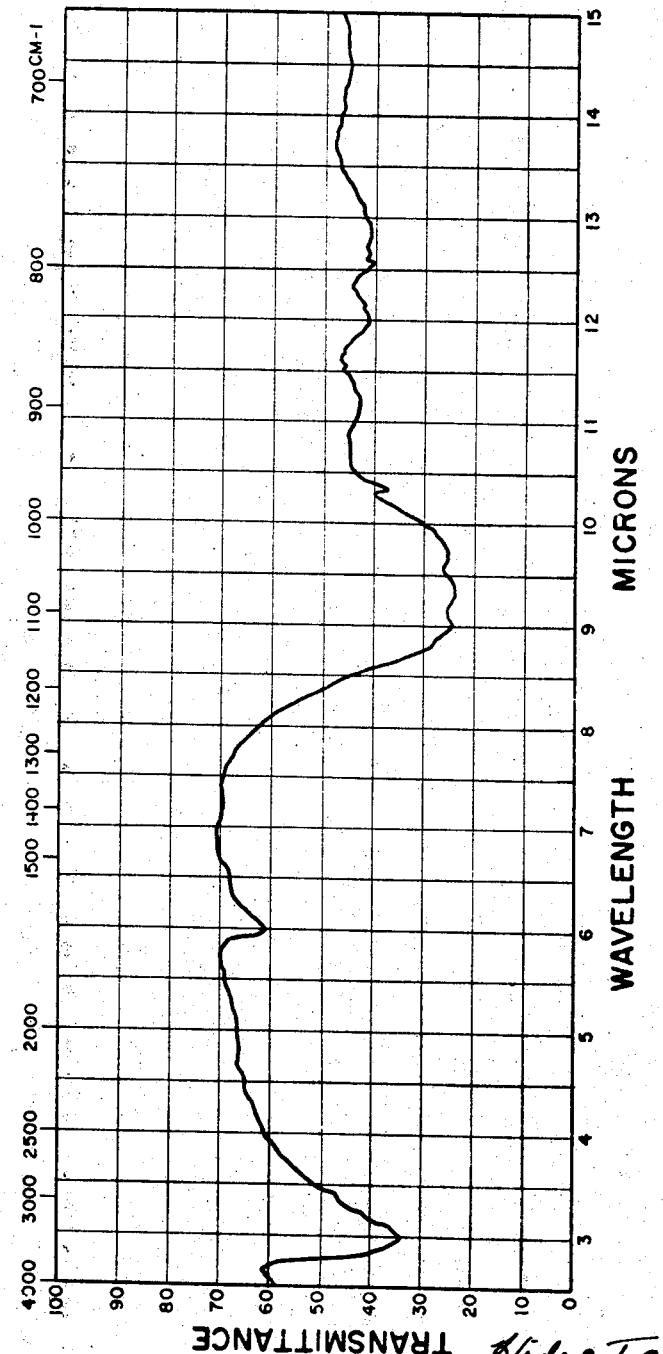

FIGS. 1, 2 and 3 show, respectively, infrared absorption spectrum of the basic copper sulfate as prepared in Example 1, that of brochantite-type basic copper sulfate, and that of langite. The spectrum of the basic copper sulfate as prepared in Example 1 or of brochantite-type basic copper sulfate is obtained by the liquid paraffin mull technique, while that of langite is obtained by the potassium bromide technique. As is shown in these figures, the basic copper sulfate as prepared in Example 1 has a different absorption pattern from that of brochantite-type basic copper sulfate or of langite at around $3\mu$, $9$–$9.5\mu$ and $10$–$14\mu$, which are, respectively, due to the stretching vibration of OH, the stretching vibration of $SO_4$ and to the bending vibration of OH. Further, while basic copper sulfate as prepared as in Example 1 shows an absorption band at $6.05\mu$ due to $H_2O$, brochantite-type basic copper sulfate has no such absorption band.

Wave length in microns at which remarkable absorption bands are observed with the basic copper sulfate as prepared in Example 1 are as follows:

| | | | |
|---|---|---|---|
| 2.8 (sh) | 3.0 (s) | 3.1 (s) | 6.05 (w) |
| 8.75 (sh) | 8.95 (s) | 9.40 (s) | 11.40 (m) |
| 12.65 (m) | | | | w=weak.
m=medium.
sh=shoulder.
s=strong.

Figure 4:
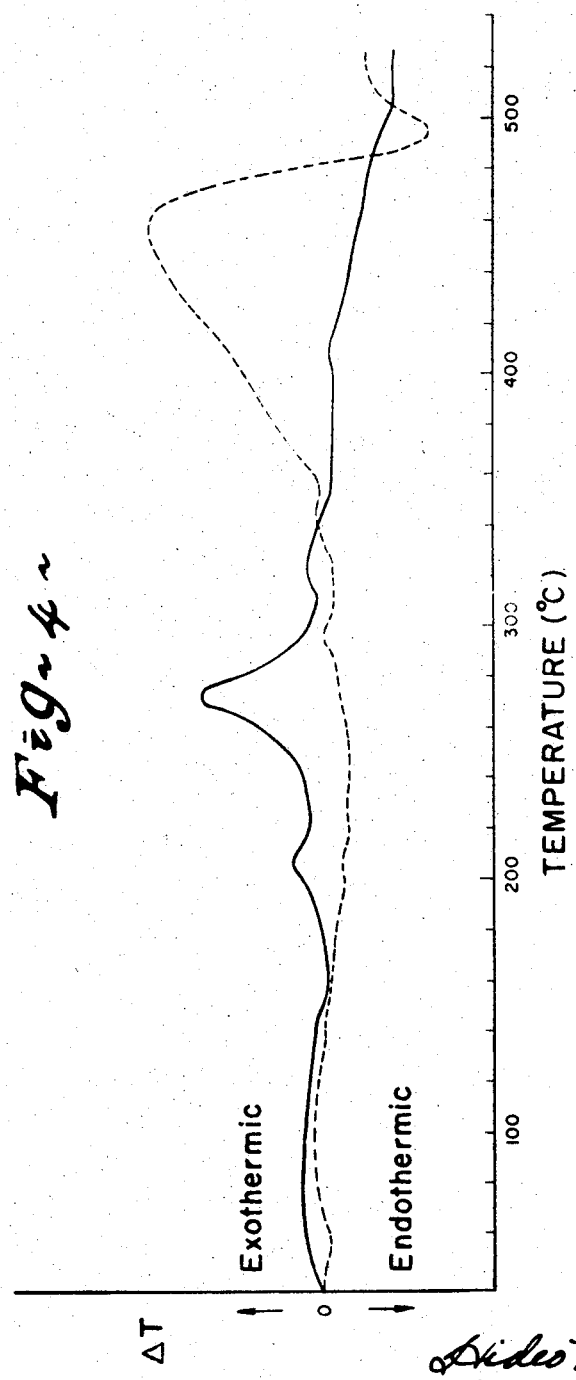

FIG. 4 shows thermogram of the basic copper sulfate as prepared in Example 1 and of brochantite-type basic copper sulfate, wherein the solid line shows thermogram of the basic copper sulfate as prepared in Example 1, and the dotted line shows that of brochantite-type basic copper sulfate. As is clearly shown in the figure, while brochantite-type basic copper sulfate is very stable to heat, the decomposition (dehydration occurs at a relatively low temperature in the basic copper sulfate as prepared in Example 1.

Figure 5:
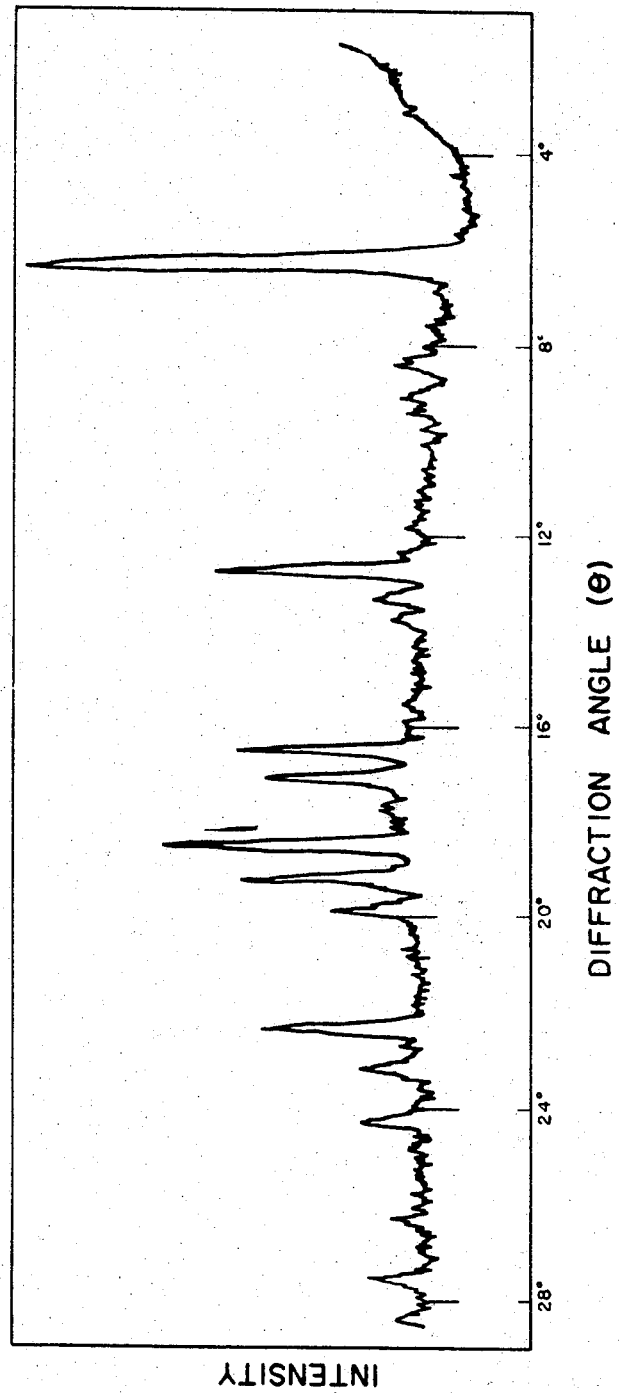
Figure 6:
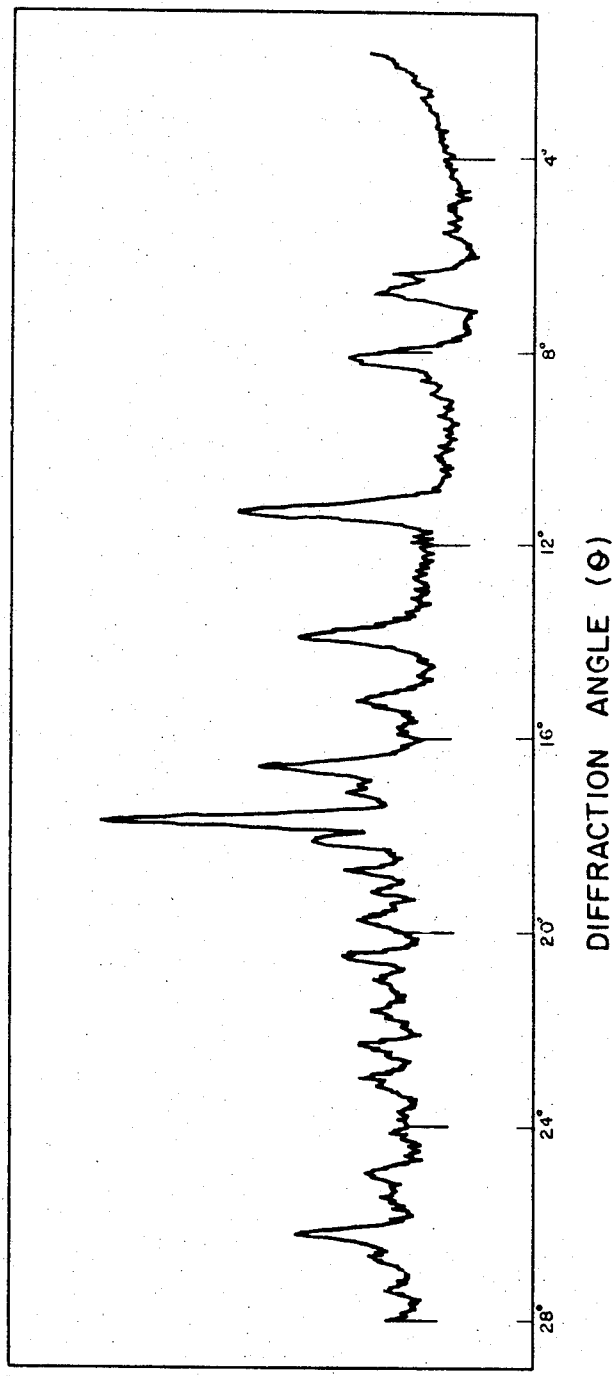

FIGS. 5 and 6 show X-ray diffraction patterns of the basic copper sulfate as prepared in Example 1 and of brochantite-type basic copper sulfate, respectively.

Having thus disclosed this invention, what is claimed is:

1. Basic copper sulfate crystal of the molecular formula $$Cu_4(OH)_6SO_4 \cdot H_2O$$

and having the lattice unit formula $$Cu_{16}(OH_{24}(SO_4)_4 \cdot (H_2O)_4$$

with the following lattice spacings:

6.95 angstrom (very strong)
3.47 angstrom (middle)
2.70 angstrom (middle)
2.62 angstrom (middle)
2.42 angstrom (middle)
2.33 angstrom (middle)
2.26 angstrom (middle)
2.02 angstrom (middle)
1.99 angstrom (middle)
1.54 angstrom (weak)

2. The basic copper sulfate crystal according to claim 1, the crystal system of which is orthorhombic, the specific gravity of which is about 3.42 and the lattice constants of which are: $a=6.03$; $b=10.80$; and $c=13.90$.

3. A method for preparing basic copper sulfate crystal of the formula $$Cu_4(OH)_6SO_4 \cdot H_2O$$

said crystal having the following lattice spacings:

6.95 angstrom (very strong)
3.47 angstrom (middle)
2.70 angstrom (middle)
2.62 angstrom (middle)
2.42 angstrom (middle)
2.33 angstrom (middle)
2.26 angstrom (middle)
2.02 angstrom (middle)
1.99 angstrom (middle)
1.54 angstrom (weak)

which comprises reacting cupric sulfate with alkali hydroxide in the presence of anion donor selected from the group consisting of phosphoric acid, boric acid, arsenic acid and alkali salts thereof, the molar ratios of cupric sulfate, alkali hydroxide and anion donor being 1:about 1:3 to about 1:6:about 0.002 to about 0.1.

4. The method according to claim 3, wherein the reaction is carried out in the presence of alkali phosphate.

5. The method according to claim 3, wherein an aqueous solution of the cupric sulfate and an aqueous solution of the alkali hydroxide are simultaneously added to an aqueous solution of the anion donor at the same rate, whereby when any fractional quantity of the one solution has been added the same fractional quantity of the other solution will have been added.

6. The method according to claim 5, wherein the amount of the alkali hydroxide is 1.4 to 1.5 mols per mol of the cupric sulfate.

References Cited

UNITED STATES PATENTS 2,168,985   8/1939   Gulbrandsen _____ 23—125

FOREIGN PATENTS 1,253,970   1/1960   France.

OTHER REFERENCES

J. W. Mellor: A Comprehensive Treatise on Inorganic and Theoretical Chemistry, volume 3, pages 261–66, Longmans Green & Co., London, 1923.

OSCAR R. VERTIZ, *Primary Examiner.*

G. PETERS, *Assistant Examiner.*